(12) United States Patent
Gao et al.

(10) Patent No.: US 11,919,559 B2
(45) Date of Patent: Mar. 5, 2024

(54) STROLLER

(71) Applicant: GOODBABY CHILD PRODUCTS CO., LTD., Jiangsu (CN)

(72) Inventors: Xiang Gao, Jiangsu (CN); Jianyong Zhou, Jiangsu (CN)

(73) Assignee: GOODBABY CHILD PRODUCTS CO., LTD., Jiangsu (CN)

( * ) Notice: Subject to any disclaimer, the term of this patent is extended or adjusted under 35 U.S.C. 154(b) by 0 days.

(21) Appl. No.: 17/904,094

(22) PCT Filed: Aug. 26, 2020

(86) PCT No.: PCT/CN2020/111442
§ 371 (c)(1),
(2) Date: Aug. 11, 2022

(87) PCT Pub. No.: WO2021/164227
PCT Pub. Date: Aug. 26, 2021

(65) Prior Publication Data
US 2023/0067809 A1    Mar. 2, 2023

(30) Foreign Application Priority Data
Feb. 19, 2020  (CN) .......................... 202010100990.1

(51) Int. Cl.
*B62B 7/06* (2006.01)
*B62B 9/00* (2006.01)

(52) U.S. Cl.
CPC ............... *B62B 7/062* (2013.01); *B62B 9/00* (2013.01)

(58) Field of Classification Search
CPC ....... B62B 7/062; B62B 9/00; B62B 2205/20; B62B 7/068; B62B 7/06; B62B 5/065
See application file for complete search history.

(56) References Cited

U.S. PATENT DOCUMENTS 7,445,228 B2   11/2008 Henry
8,894,090 B1 * 11/2014 Chen ....................... B62B 7/062
                                               280/47.38
(Continued)

FOREIGN PATENT DOCUMENTS

CN        102815329 A  * 12/2012  ............... B62B 7/10
CN        204196984 U  *  3/2015
(Continued)

OTHER PUBLICATIONS

Translated CN-209719694-U (Year: 2023).*
(Continued)

*Primary Examiner* — James A Shriver, II
*Assistant Examiner* — Ian Bryce Shelton
(74) *Attorney, Agent, or Firm* — Knobbe, Martens, Olson & Bear, LLP

(57) ABSTRACT

A stroller comprising a frame having an unfolded state and a folded state, a front wheel assembly, a rear wheel assembly, a locking mechanism for locking the frame in the unfolded state, and the frame comprises: a front wheel support, a rear wheel support, a telescopic push rod assembly, a basket rod, a seat rod and a supporting rod. The locking mechanism comprises a first locking mechanism for locking the relative positions of the upper push rod and the lower push rod, and a second locking mechanism for locking the relative positions of the lower push rod and the sliding sleeve, the second locking mechanism comprises a retractable lock tongue arranged on the lower push rod and a lock hole arranged on the sliding sleeve.

10 Claims, 14 Drawing Sheets

(56) References Cited

U.S. PATENT DOCUMENTS

| | | | |
|---|---|---|---|
| 9,592,846 B1* | 3/2017 | Hanson | B62B 7/068 |
| 9,981,678 B1* | 5/2018 | Chen | B62B 7/068 |
| 10,913,478 B1* | 2/2021 | Zhou | B62B 7/105 |
| 2007/0085302 A1* | 4/2007 | You | B62B 7/06 |
| | | | 280/642 |
| 2010/0156060 A1* | 6/2010 | Dotsey | B62B 7/08 |
| | | | 280/47.371 |
| 2012/0187660 A1* | 7/2012 | Liao | B62B 7/086 |
| | | | 280/642 |
| 2015/0076777 A1* | 3/2015 | Cheng | B62B 7/068 |
| | | | 280/42 |
| 2015/0353115 A1* | 12/2015 | Zheng | B62B 7/006 |
| | | | 280/47.38 |
| 2017/0001524 A1* | 1/2017 | Vahle | B66C 13/12 |
| 2018/0134306 A1* | 5/2018 | Chen | B62B 7/10 |

FOREIGN PATENT DOCUMENTS

| | | | | | |
|---|---|---|---|---|---|
| CN | 205854238 U | * | 1/2017 | | B62B 7/062 |
| CN | 205930846 U | * | 2/2017 | | |
| CN | 205930846 U | | 2/2017 | | |
| CN | 207356470 U | * | 5/2018 | | |
| CN | 108263461 A | * | 7/2018 | | |
| CN | 109178077 A | * | 1/2019 | | B62B 7/06 |
| CN | 110481619 A | * | 11/2019 | | |
| CN | 110481620 A | * | 11/2019 | | |
| CN | 209719694 U | * | 12/2019 | | |
| CN | 209719694 U | | 12/2019 | | |
| EP | 1783028 A1 | * | 5/2007 | | B62B 7/08 |
| KR | 20130133124 A | | 12/2013 | | |
| WO | 2007053019 A2 | | 5/2007 | | |
| WO | WO-2007053019 A2 | * | 5/2007 | | B62B 7/08 |
| WO | WO-2007053021 A1 | * | 5/2007 | | B62B 7/123 |
| WO | WO-2014198174 A1 | * | 12/2014 | | B62B 7/06 |

OTHER PUBLICATIONS

Translated CN-207356470-U (Year: 2023).*
Translated CN-205930846-U (Year: 2023).*
International Search Report and Written Opinion issued for International Patent Application No. PCT/CN2020/111442, dated Oct. 30, 2020 in 10 pages.

* cited by examiner

STROLLER

CROSS-REFERENCE TO RELATED APPLICATIONS

This application is the U.S. National Phase under 35 U.S.C. § 371 of International Application PCT/CN2020/111442, filed Aug. 26, 2020, which is hereby incorporated by reference in its entirety and which claims priority to Chinese Patent Application 202010100990.1, filed Feb. 19, 2020.

TECHNICAL FIELD OF THE INVENTION

The present disclosure relates to a child stroller, and specifically to an auto-folding stroller.

BACKGROUND OF THE INVENTION

The stroller is a vehicle used to carry children. In order to reduce the storage space, the stroller is generally designed to be foldable. However, the existing stroller cannot be automatically folded, and generally, it is necessary to grasp the main body of the frame with one hand after the locking mechanism is unlocked, and hold other parts of the frame with the other hand to fold it to the frame so that the stroller can be completely folded, but when a child is taken out of the stroller, at least one hand of an adult is occupied. At this time, it is very difficult to fold the stroller, and a stroller that can be automatically folded after the locking mechanism is unlocked is desired.

SUMMARY OF THE INVENTION

The present disclosure is aimed to overcome the deficiencies of the prior art, and provide a stroller which can be automatically folded after the locking mechanism is unlocked.

To achieve the above purpose, a technical solution employed by the present disclosure is: A stroller comprising a frame having an unfolded state and a folded state, a front wheel assembly, a rear wheel assembly, a locking mechanism for locking the frame in the unfolded state, and the frame comprises:
  a front wheel support, the front wheel assembly is arranged at a lower portion of the front wheel support, and a sliding sleeve is fixedly arranged on an upper portion of the front wheel support;
  a rear wheel support, the rear wheel assembly is arranged at a lower portion of the rear wheel support, and an upper portion of the rear wheel support is rotatably connected to the upper portion of the front wheel support;
  a telescopic push rod assembly, the push rod assembly comprises an upper push rod and a lower push rod, the upper push rod and the lower push rod are slidably arranged relative to each other, the lower push rod is slidably arranged in the sliding sleeve in a penetrating manner in the length direction thereof, and a lower end portion of the lower push rod is located below the sliding sleeve;
  a basket rod, the front end of the basket rod is rotatably connected to the lower end portion of the lower push rod, and the rear portion of the basket rod is rotatably connected to the rear wheel support;
  a seat rod extending in a front-rear direction, a rear portion of the seat rod extends downwards and is rotatably connected to the lower end portion of the lower push rod;
  a supporting rod, an upper end portion of the supporting rod is rotatably connected to a front portion of the seat rod, and a lower end portion of the supporting rod is rotatably connected to the front wheel support;
  when the frame is converted from the unfolded state to the folded state, the lower push rod slides downwards relative to the sliding sleeve to drive the basket rod, the seat rod, the supporting rod, and the rear wheel support to be folded to the front wheel support, and automatic folding of the stroller is completed.

Preferably, the locking mechanism comprises a first locking mechanism for locking the relative positions of the upper push rod and the lower push rod, and when the first locking mechanism is unlocked, the upper push rod slides downwards relative to the lower push rod, and when the upper push rod slides downwards to the end point, it collides with the lower push rod and generates an impact force, and the impact force acts on the lower push rod.

Further preferably, when the first locking mechanism is unlocked, the upper push rod slides downwards after overcoming the frictional force between it and the lower push rod under the action of its own gravity.

Further preferably, the lower push rod is subjected to the following forces in its length direction: the component force g1 of the gravity G1 received by the push rod assembly in the length direction of the lower push rod, the component force g2 of the gravity G2 acting on the push rod assembly by other components connected with the push rod assembly in the length direction of the lower push rod, the impact force fa, and the component force fb of the force Fb acting on the lower push rod by the basket rod in the length direction of the lower push rod, and the frictional force f between the lower push rod and the sliding sleeve, and when the frame is converted from the unfolded state to the folded state, the directions of the component force g1, the component force g2 and the impact force fa are the same as the sliding direction of the lower push rod relative to the sliding sleeve, and the component force fb and the friction force f are opposite to the sliding direction of the lower push rod relative to the sliding sleeve, and $(g1+g2+fa)/(fb+f)>1$.

Further preferably, $1.05<(g1+g2+fa)/(fb+f)<1.5$.

Further preferably, $1.1<(g1+g2+fa)/(fb+f)<1.2$.

Further preferably, the locking mechanism further comprises a second locking mechanism for locking the relative positions of the lower push rod and the sliding sleeve, and when the locking mechanism is unlocked, the first locking mechanism is unlocked first, and the impact force drives the second locking mechanism to get unlocked.

Further preferably, the second locking mechanism comprises a retractable lock tongue arranged on the lower push rod and a lock hole arranged on the sliding sleeve, the lock tongue is inserted into the lock hole when the second locking mechanism is in a locked state, and the impact force is used to drive the lock tongue to retract from the lock hole to unlock the second locking mechanism.

Further preferably, the second locking mechanism further comprises a movable piece movably arranged on the lower push rod in an up-down direction, an upper end portion of the movable piece protrudes upwards out of the upper end surface of the lower push rod, and the movable piece is provided with an slope inclined to the upper end surface of the lower push rod, the lock tongue is provided with a contact surface perpendicular to the upper end surface of the lower push rod, and when the movable piece moves downward, the slope moves downwards and drives the lock tongue out of the lock hole through the contact surface.

Preferably, when the frame is in the unfolded state, an angle between the basket rod and the lower push rod is an acute angle.

Preferably, the upper push rod is slidably arranged in a cavity of the lower push rod in a penetrating manner, a rotatable first roller is arranged on the lower end portion of the upper push rod, and the outer circumferential surface of the first roller is contact with the inner wall of the lower push rod.

Preferably, a rotatable second roller is arranged within the sliding sleeve, and the outer circumferential surface of the second roller is contact with the outer wall of the lower push rod.

Further preferably, the frame further comprises a push handle connected to the upper end portion of the upper push rod, the push handle is provided with an unlock button for unlocking the locking mechanism, and after the unlock button is unlocked, the upper push rod slides downwards after overcoming the frictional force between it and the lower push rod under the action of its own gravity and the gravity of the push handle.

To achieve the above purpose, a technical solution employed by the present disclosure is: A stroller comprising a frame having an unfolded state and a folded state, a front wheel assembly, a rear wheel assembly, a locking mechanism for locking the frame in the unfolded state, and the frame comprises:

a front wheel support, the front wheel assembly is arranged at a lower portion of the front wheel support, and a sliding sleeve is arranged on an upper portion of the front wheel support; a rear wheel support, the rear wheel assembly is arranged at a lower portion of the rear wheel support, and an upper portion of the rear wheel support is rotatably connected to the upper portion of the front wheel support; a telescopic push rod assembly, the push rod assembly comprises an upper push rod and a lower push rod, the upper push rod and the lower push rod are slidably arranged relative to each other, the lower push rod is slidably arranged in the sliding sleeve in a penetrating manner in the length direction thereof, and a lower end portion of the lower push rod is located below the sliding sleeve; a basket rod, the front end of the basket rod is rotatably connected to the lower end portion of the lower push rod, and the rear portion of the basket rod is rotatably connected to the rear wheel support; a seat rod extending in a front-rear direction, a rear portion of the seat rod extends downwards and is rotatably connected to the lower end portion of the lower push rod; a supporting rod, an upper end portion of the supporting rod is connected to a front portion of the seat rod, and a lower end portion of the supporting rod is rotatably connected to the front wheel support; when the frame is converted from the unfolded state to the folded state, the lower push rod slides downwards relative to the sliding sleeve.

Due to the use of the above technical solutions, the present disclosure has the following advantages over the prior art:

In a stroller provided by the present disclosure, by fixing a sliding sleeve on the upper portion of a front wheel support, and rotatably connecting the upper portion of a rear wheel support to the upper portion of the front wheel support, by slidably arranging a lower push rod in the sliding sleeve in a penetrating manner in the length direction thereof, by arranging a basket rod, the front end of which is rotatably connected to the lower push rod and the rear portion of which is rotatably connected to the rear wheel support, by arranging a seat rod, the rear portion of which extends downwards and is rotatably connected to the lower push rod, and by arranging a supporting rod, the upper end portion of which is connected to the front portion of the seat rod and the lower end portion of which is rotatably connected to the front wheel support, when the locking mechanism is unlocked, the lower push rod slides downwards relative to the sliding sleeve to drive the rear wheel support, the seat rod, the supporting rod and the basket rod to be folded to the front wheel support, and automatic folding of the stroller is completed.

Wherein, 10. frame; 101. front wheel support; 1011. sliding sleeve; 1012. second roller; 102. rear wheel support; 103. push rod assembly; 1031. upper push rod; 1032. lower push rod; 1033. first roller; 104. basket rod; 105. seat rod; 1051. supporting plate; 106. supporting rod; 107. push handle; 1071. unlock button; 108. canopy rod; 20. front wheel assembly; 30. rear wheel assembly; 401. first locking mechanism; 4011. first lock tongue; 4012. first lock hole; 402. second locking mechanism; 4021. second lock tongue; 4022. second lock hole; 50. foot board; 51. connecting rod; 52. first mounting block; 53. first movable piece; 531. first slope; 532. first contact surface; 54. second mounting block; 55. second movable piece; 551. second slope; 552. second contact surface; 56. mounting groove.

DETAILED DESCRIPTION OF EXEMPLARY EMBODIMENTS

Figure 1:
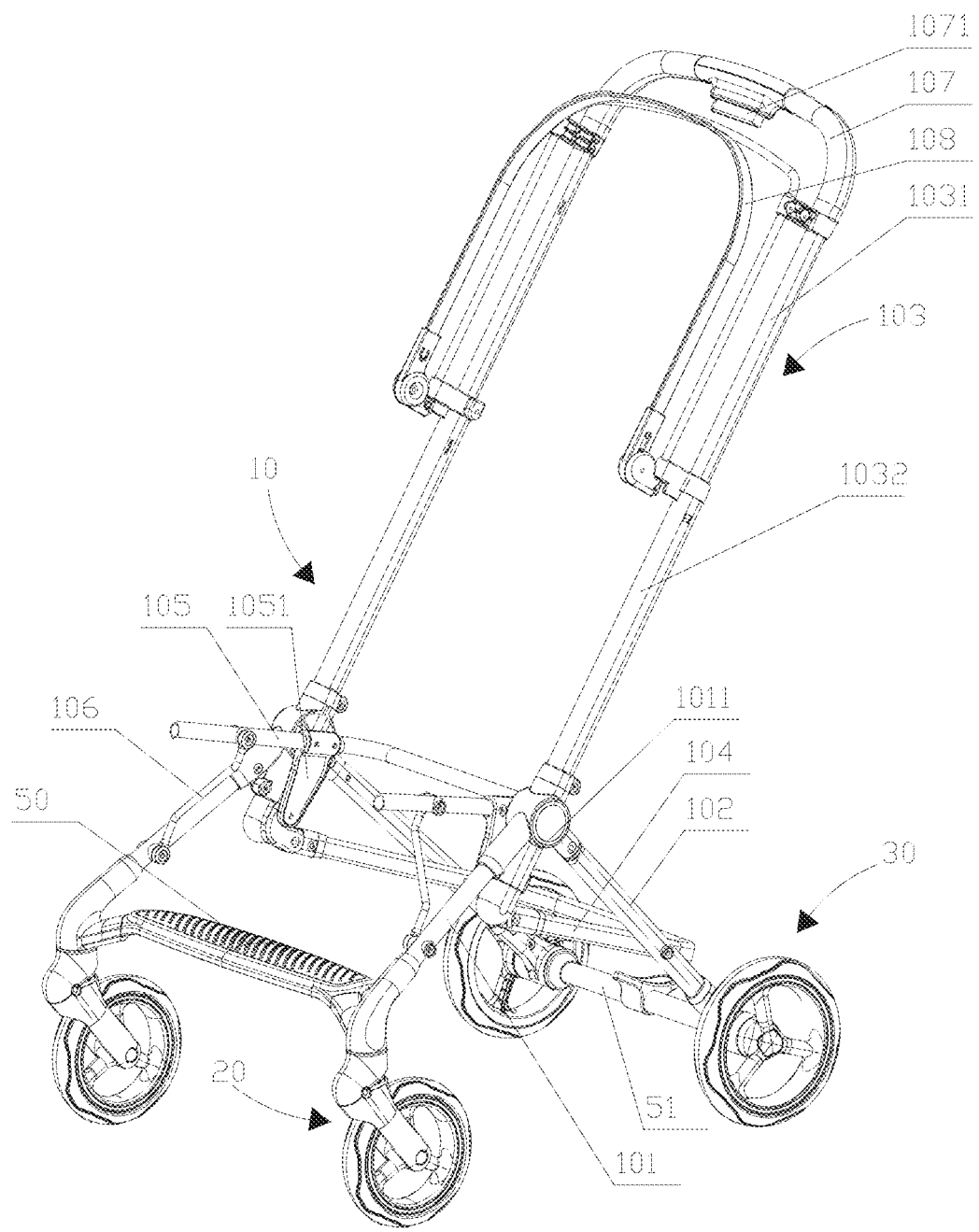
FIG. 1 is a three-dimensional diagram of the present disclosure, where the stroller is in an unfolded state.
Figure 2:
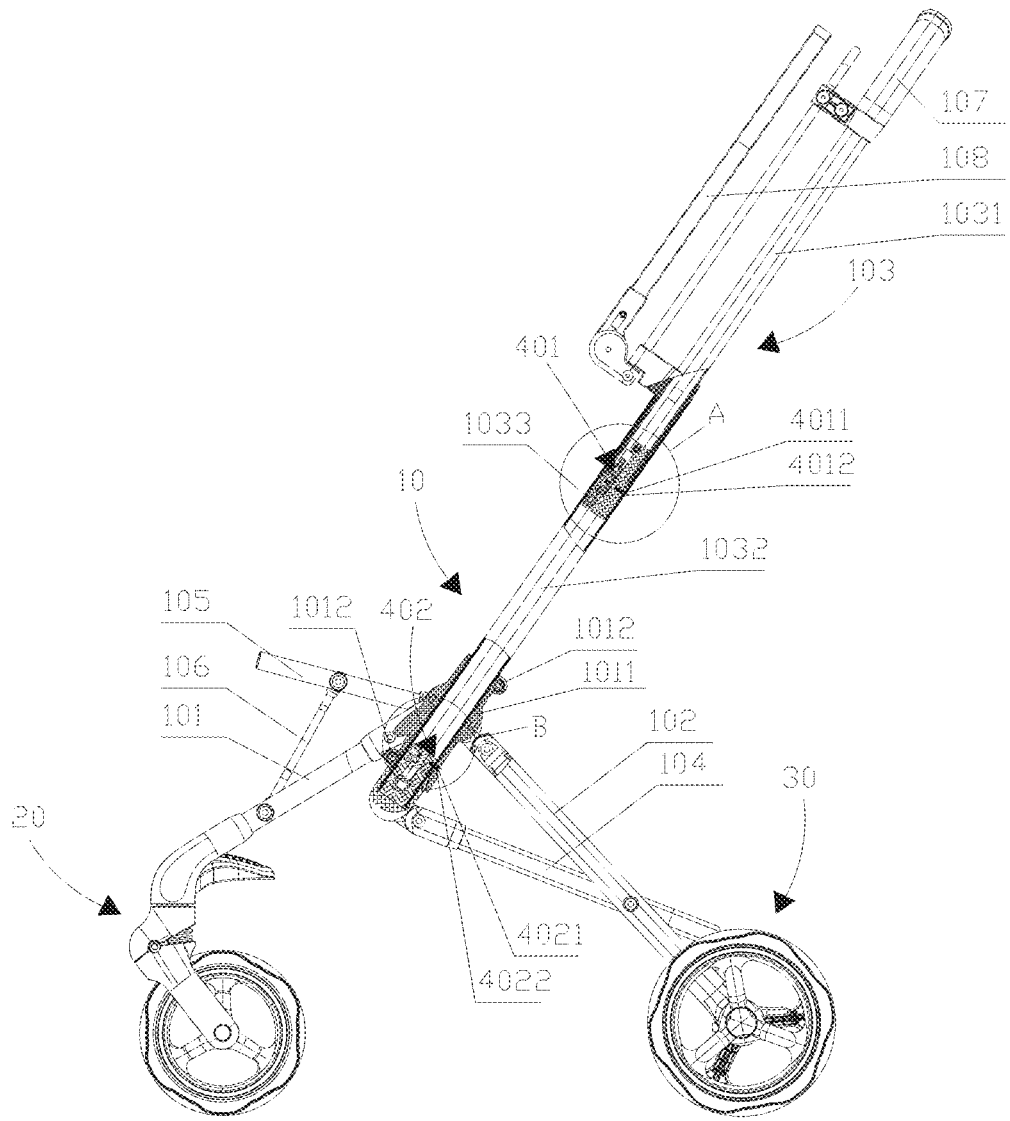
FIG. 2 is a schematic side view of the present disclosure, partially cut away, where the stroller is in an unfolded state.
Figure 3:
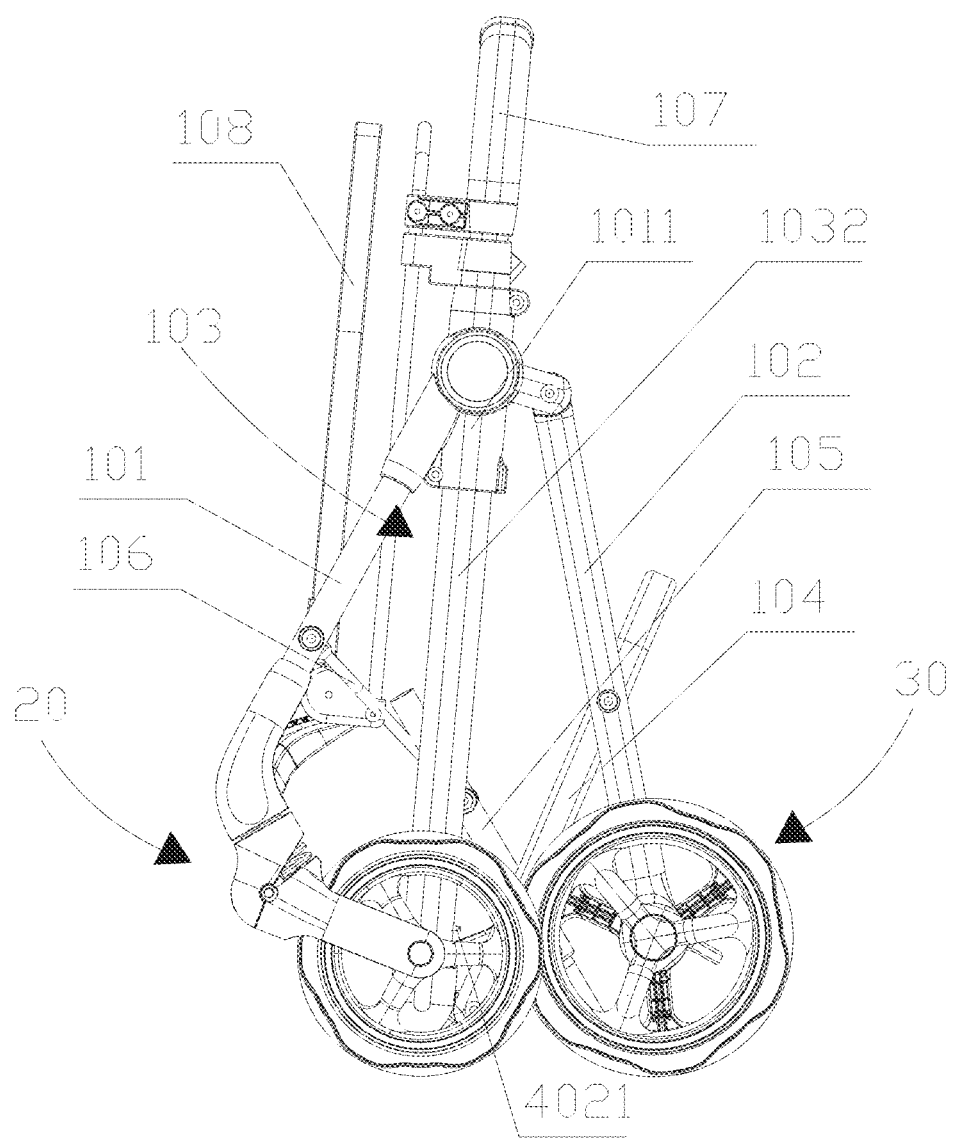
FIG. 3 is a schematic side view of the present disclosure, where the stroller is in a folded state.
Figure 4:
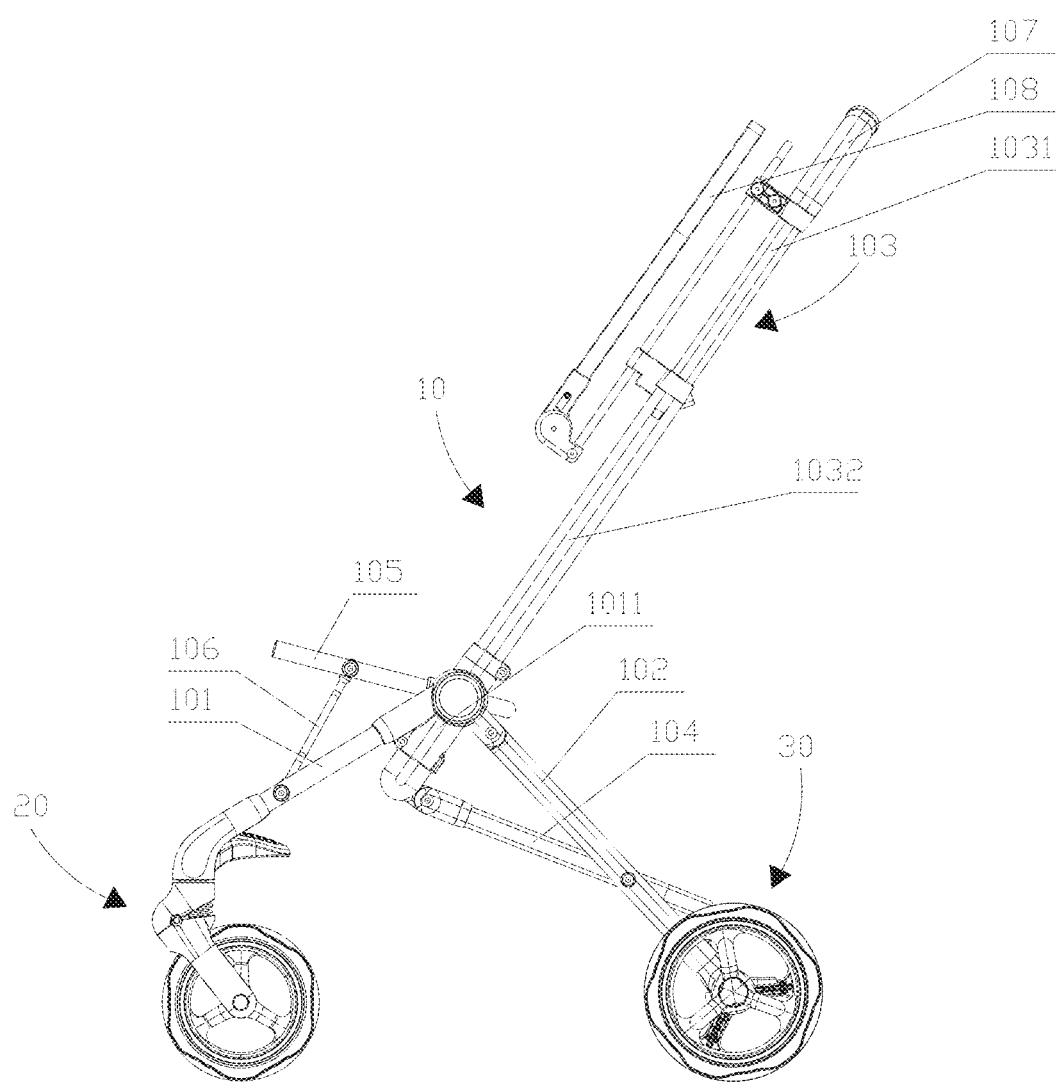
FIGS. 4, 5, 6 and 7 are exploded step diagrams of Embodiment 1 according to the present disclosure from the unfolded state to the folded state.
Figure 5:
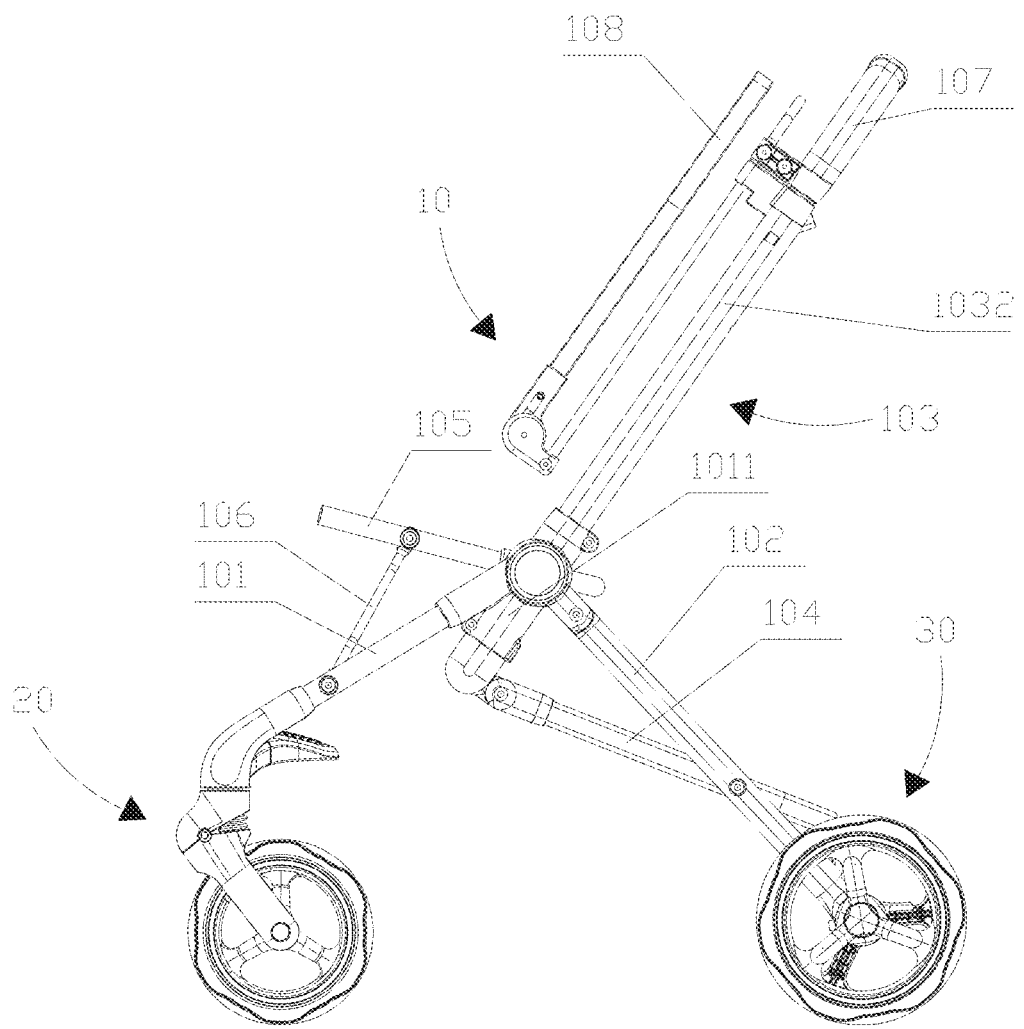
Figure 6:
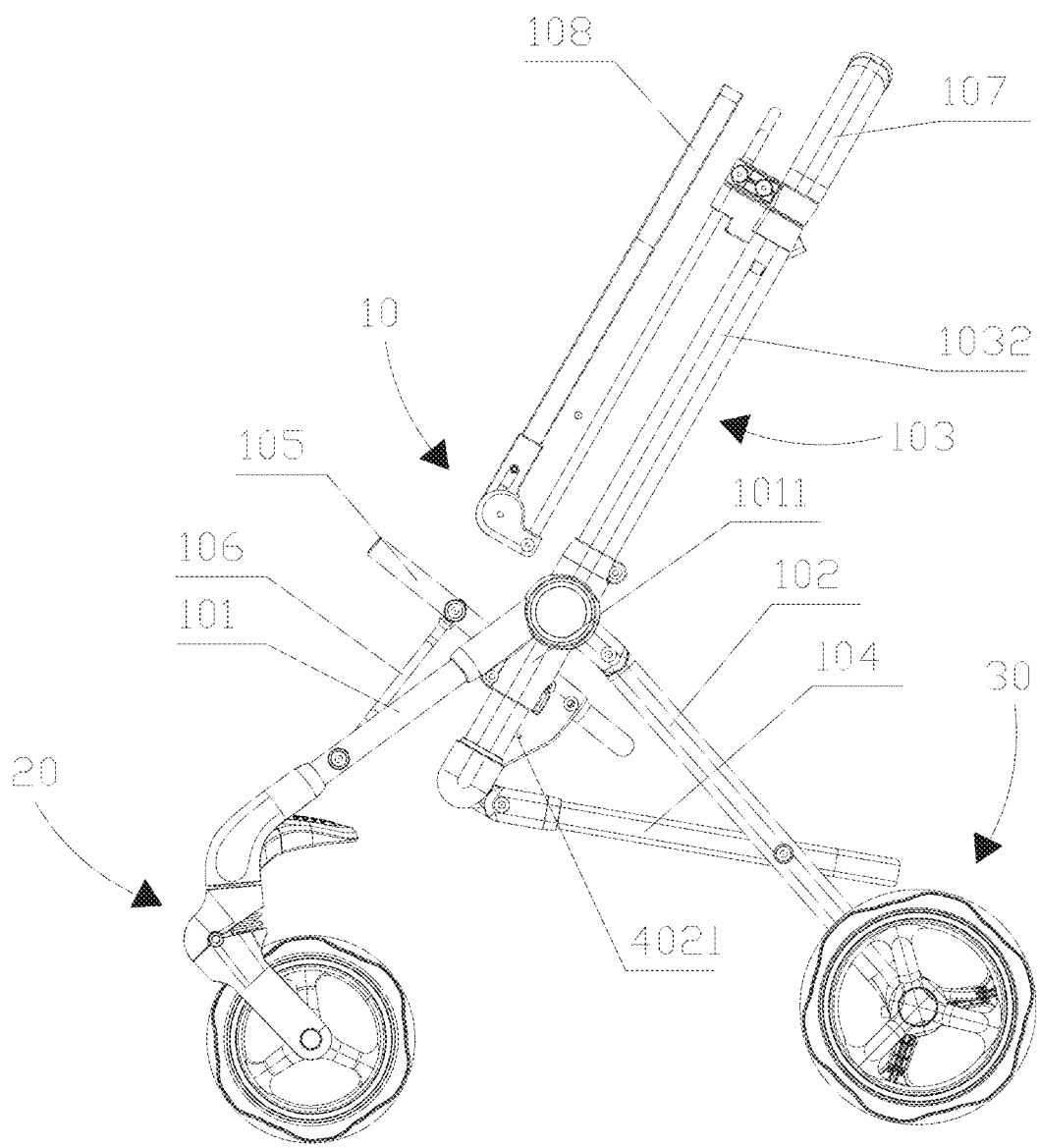
Figure 7:
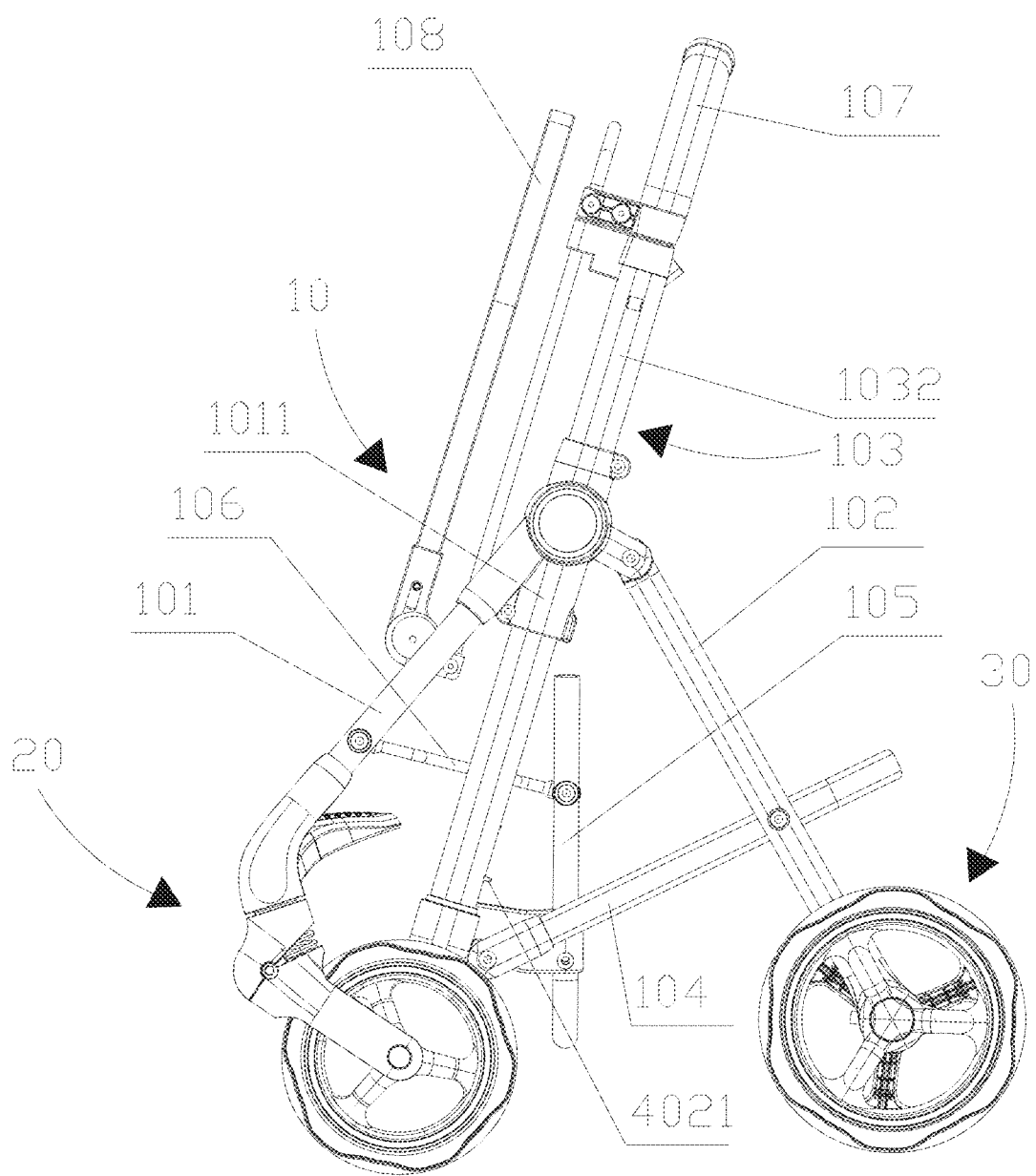
Figure 8:
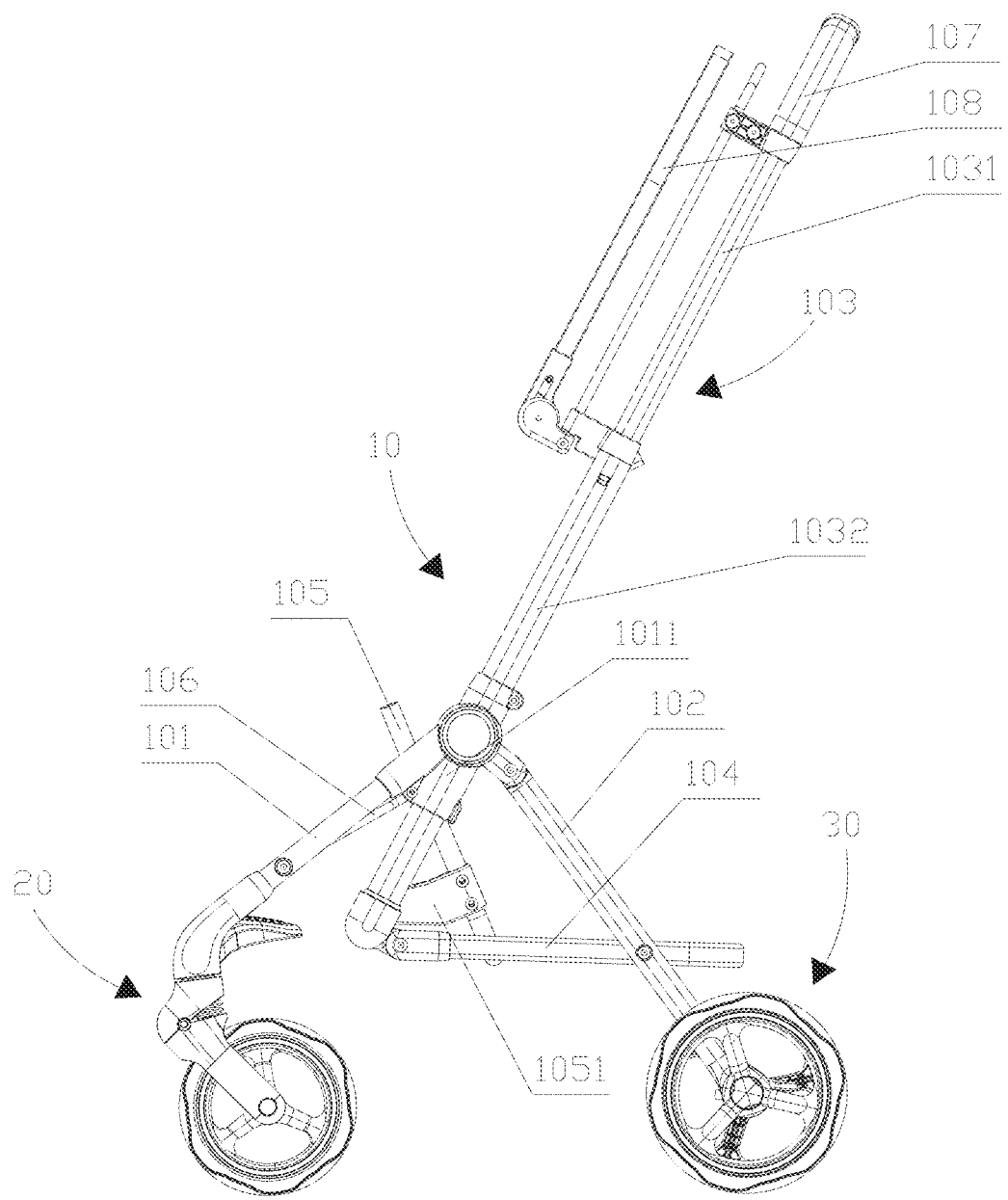
FIGS. 8, 9, 10 and 11 are exploded step diagrams of Embodiment 2 according to the present disclosure from the unfolded state to the folded state.
Figure 9:
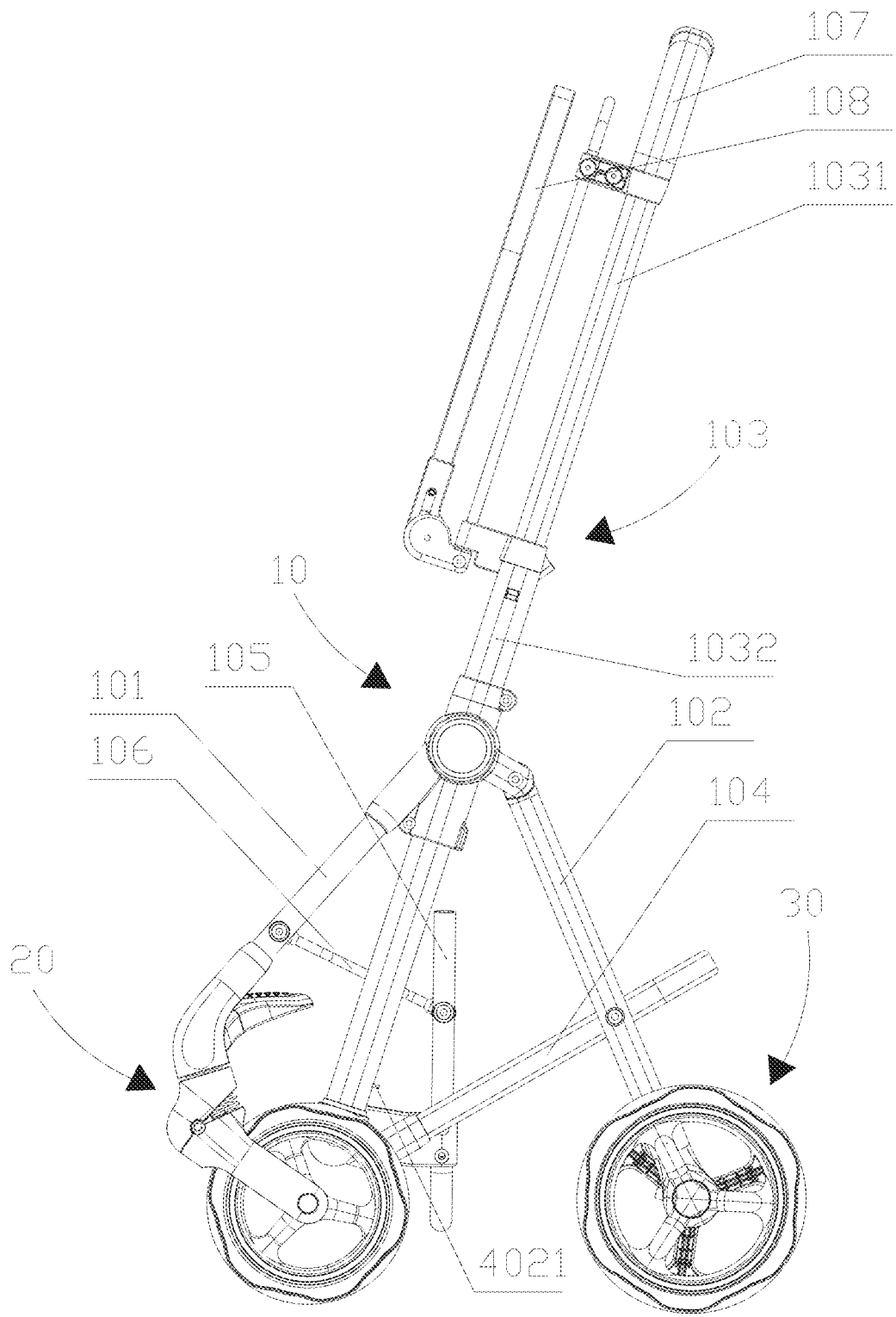
Figure 10:
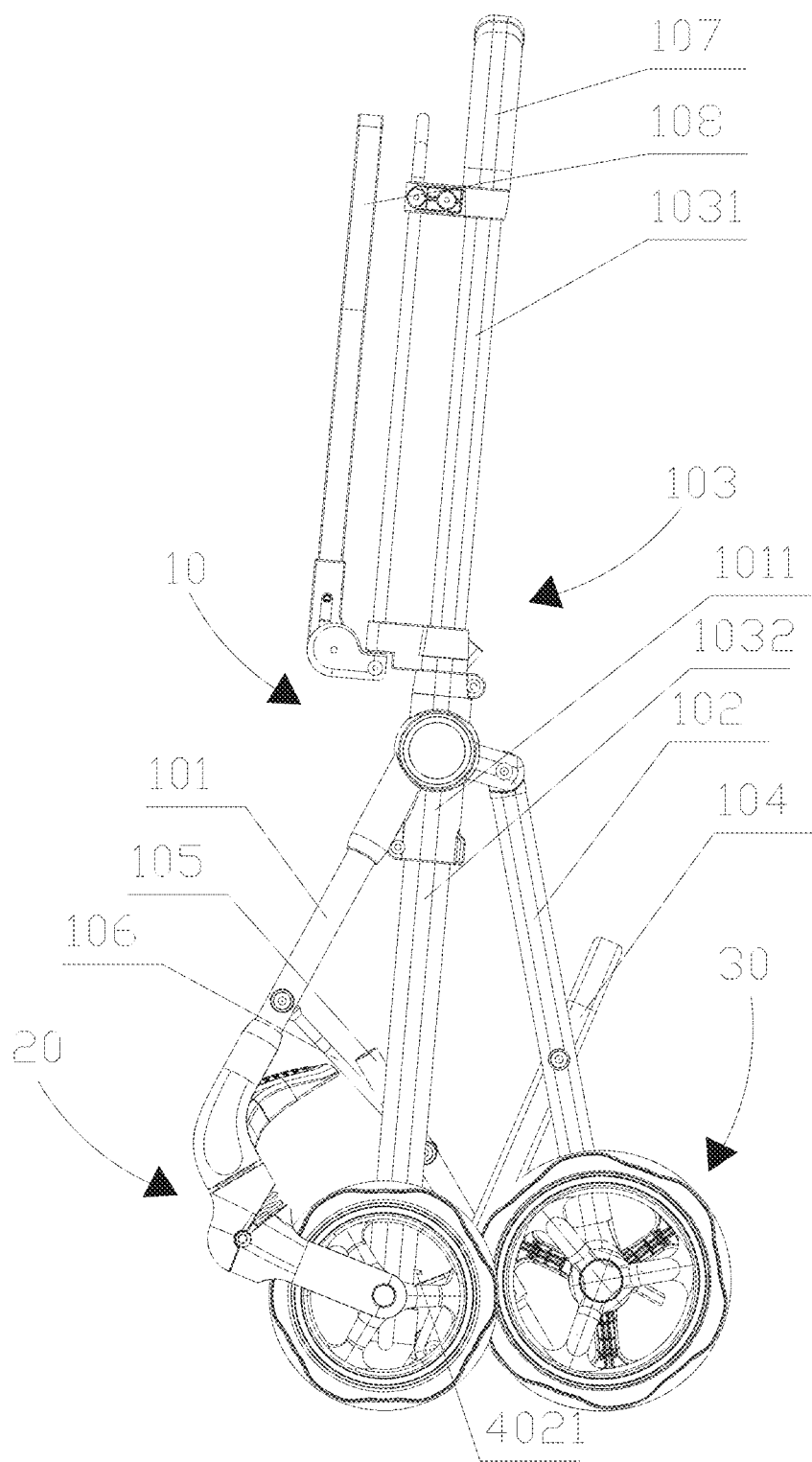
Figure 11:
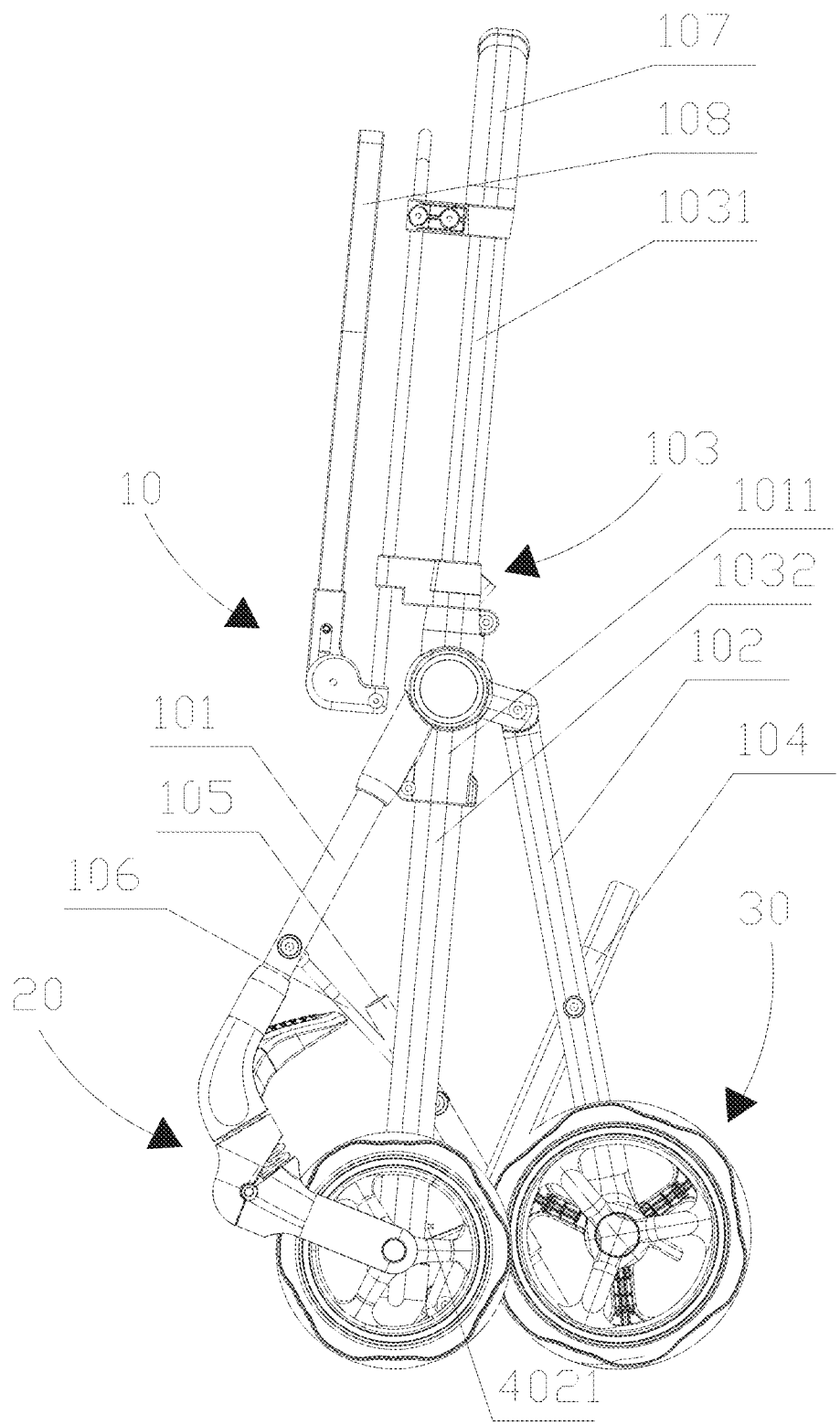

In the following, the technical solution of the present disclosure is further described combining with the accompanying drawings:

The definitions of directions such as up and down, front and rear in this disclosure are all defined with reference to the directions that children observe when riding on the stroller, and specifically, the up and down directions in this disclosure refer to the up and down directions in FIG. 1 and the front and rear directions in the present disclosure refer to the left and right directions in FIG. 1.

As shown in FIGS. 1-11, FIG. 13 and FIG. 14, a stroller provided by the present disclosure comprises a frame 10 having an unfolded state and a folded state, front wheel assemblies 20, rear wheel assemblies 30, a locking mechanism for locking the frame 10 in the unfolded state. The frame 10 is arranged symmetrically on the left and right sides.

The frame 10 comprises: a front wheel support 101, a rear wheel support 102, a push rod assembly 103, a basket rod 104, a seat rod 105, a supporting rod 106, a push handle 107, and a canopy rod 108. Wherein, the front wheel assembly 20 is arranged on the lower portion of the front wheel support 101, the lower portion of the front wheel support 101 is further provided with a foot board 50, and the foot board 50 is used for placing the child's feet when the child is riding; a sliding sleeve 1011 is arranged on an upper portion of the front wheel support 101, and in this embodiment, the sliding sleeve 1011 is fixed on the upper portion of the front wheel support 101. The rear wheel assembly 30 is arranged at the lower portion of the rear wheel support 102, and the two rear wheel assemblies 30 are connected by a connecting rod 51, the rear wheel support 102 is arranged on the connecting rod 51, and the upper portion of the rear wheel support 102 is rotatably connected with the upper portion of the front wheel support 101. Specifically, the upper portion of the front wheel support 101 has a protruding portion protruding rearward and downward, and the upper portion of the rear wheel support 102 is rotatably connected to the protruding portion. The push rod assembly 103 is retractable, and the push rod assembly 103 comprises an upper push rod 1031 and a lower push rod 1032, the upper push rod 1031 and the lower push rod 1032 are slidably arranged relative to each other. Specifically, the lower push rod 1032 has a cavity extending along its length direction, the upper push rod 1031 is slidably arranged in the cavity of the lower push rod 1032, the lower push rod 1032 is slidably arranged in the sliding sleeve 1011 in a penetrating manner in the length direction thereof, and the lower end portion of the lower push rod 1032 is located below the sliding sleeve 1011. A rotatable first roller 1033 is arranged on the lower end portion of the upper push rod 1031, specifically, a first mounting block 52 is arranged on the lower end portion of the upper push rod 1031, the first roller 1033 is rotatably arranged on the first mounting block 52, and the outer circumferential surface of the first roller 1033 is in contact with the inner wall of the lower push rod 1032, the first roller 1033 is used to support the upper push rod 1031 to slide in the cavity of the lower push rod 1032, and convert the sliding friction between the upper push rod 1031 and the lower push rod 1032 into rolling friction, so as to reduce the friction force generated when the upper push rod 1031 slides relative to the lower push rod 1032. A rotatable second roller 1012 is arranged within the sliding sleeve 1011, specifically, a mounting groove 56 is arranged on the inner wall of the sliding sleeve 1011, the second roller 1012 is rotatably arranged in the mounting groove 56, and the outer circumferential surface of the second roller 1012 is in contact with the outer wall of the lower push rod 1032, the second roller 1012 is used to support the lower push rod 1032 to slide in the sliding sleeve 1011, and convert the sliding friction between the lower push rod 1032 and the sliding sleeve 1011 into rolling friction, to reduce the friction force generated when the lower push rod 1032 slides relative to the sliding sleeve 1011. The front end of the basket rod 104 is rotatably connected with the lower end portion of the lower push rod 1032, specifically, the lower end portion of the lower push rod 1032 is provided with a connecting portion protruding backward and downward, and the front portion of the basket rod 104 is rotatably connected to the connecting portion, the rear portion of the basket rod 104 is rotatably connected to the rear wheel support 102, and when the frame 10 is in the unfolded state, the angle between the basket rod 104 and the lower push rod 1032 is an acute angle, and the advantage of this arrangement is that the structure of the frame 10 is more compact. The seat rod 105 extends in the front-rear direction, and the rear portion of the seat rod 105 extends downward and is rotatably connected to the lower portion of the lower push rod 1032, specifically, the seat rod 105 comprises a supporting plate 1051 fixedly connected to the rear portion thereof, the lower end portion of the supporting plate 1051 is rotatably connected to the lower portion of the lower push rod 1032. The upper end portion of the supporting rod 106 is rotatably connected to the front portion of the seat rod 105, the lower end portion of the supporting rod 106 is rotatably connected with the front wheel support 101. When the frame 10 is converted from the unfolded state to the folded state, the lower push rod 1032 slides downward relative to the sliding sleeve 1011, so that the basket rod 104, the seat rod 105, the supporting rod 106, and the rear wheel support 102 are folded to the front wheel support 101. Specifically, when the frame 10 is in the unfolded state, the basket rod 104 is inclined backward and downward, the angle between the basket rod 104 and the lower push rod 1032 is an acute angle, and the supporting rod 106 supports the front portion of the seat rod 105 upward, so that the front portion of the seat rod 105 is slightly higher and the rear portion thereof is slightly lower, and that the plane where the seat rod 105 is located is roughly parallel to the horizontal plane, after putting a seat on the seat rod 105, it is convenient for children to ride, the angle between the rear wheel support 102 and the front wheel support 101 is about 90°. When the frame 10 is in the folded state, the basket rod 104 is turned forward under the driving of the lower push rod 1032, so that the rear portion of the basket rod 104 is higher than the front portion thereof and inclined upward and rearward, and that the angle between the basket rod 104 and the lower push rod 1032 is further reduced, the supporting rod 106 presses down the front portion of the seat rod 105, and the supporting plate 1051 on the seat rod 105 is driven by the lower push rod 1032 to turn the rear portion of the seat rod 105 downward, the front portion of the seat rod 105 is located above the rear portion of the seat rod 105, the plane where the seat rod 105 is located and the horizontal plane form an angle of about 60°, and the rear wheel support 102 rotates forward relative to the front wheel support 101, so that the angle between the rear wheel support 102 and the front wheel support 101 is reduced to about 45°, and the automatic folding of the stroller is completed. The push handle 107 is connected to the upper end portion of the upper push rod 1031, an unlocking device is arranged on the push handle 107, the unlocking device in this embodiment is an unlock button 1071, and when the unlock button 1071 is pressed, the locking mechanism is unlocked. The canopy rod 108 is arranged on the upper end portion of the upper push rod 1031 as a support for a sunshade, and when the upper push rod 1031 slides downward relative to the lower push rod 1032, the canopy rod 108 also slides downward relative to the lower push rod 1032.

As shown in FIGS. 1-11, 13 and 14, the locking mechanism comprises a first locking mechanism 401 for locking the relative position of the upper push rod 1031 and the lower push rod 1032 and a second locking mechanism 402 for locking the relative position of the lower push rod 1032 and the sliding sleeve 1011. The first locking mechanism 401 comprises a retractable first lock tongue 4011 arranged on the upper push rod 1031 and a first lock hole 4012 arranged on the lower push rod 1032, and when the first locking mechanism 401 is in the locked state, the first lock tongue 4011 is inserted into the first lock hole 4012. The second locking mechanism 402 comprises a retractable second lock tongue 4021 arranged on the lower push rod 1032 and a second lock hole 4022 arranged on the sliding sleeve 1011, and when the second locking mechanism 402 is in the locked state, the second lock tongue 4021 is inserted into the second lock hole 4022.

When the locking mechanism is unlocked, the first locking mechanism 401 is unlocked first, as shown in Embodiment 1 of FIGS. 4-7, after the first locking mechanism 401 is unlocked, the first lock tongue 4011 is retracted from the first lock hole 4012, and the upper push rod 1031 slides downward under the combined action of its own gravity, the gravity of the push handle 107 and the gravity of the canopy rod 108 and overcomes the frictional force between it and the lower push rod 1032, and it is conceivable that when the push handle 107, the canopy rod 108 and other components mounted on the upper push rod 1031 are not provided, the upper push rod 1031 should overcome the frictional force between the upper push rod 1031 and the lower push rod 1032 under the action of its own gravity to slide downward. When the upper push rod 1031 slides downward to the end point relative to the lower push rod 1032, it collides with the lower push rod 1032 and generates an impact force fa, and the impact force fa drives the second lock tongue 4021 to retract from the second lock hole 4022 to unlock the second locking mechanism 402. Of course, when the locking mechanism is unlocked, it may be that the second locking mechanism 402 is unlocked first, after the second locking mechanism 402 is unlocked, the second lock tongue 4021 is retracted from the second lock hole 4022, as shown in Embodiment 2 of FIGS. 8-11, the lower push rod 1032 slides downward relative to the sliding sleeve 1011, and when the lower push rod 1032 slides downward to the end point, the upper portion of the lower push rod 1032 collides with the sliding sleeve 1011 and generates an impact force, and the impact force drives the first lock tongue 4011 to retract from the first lock hole 4012 to unlock the first locking mechanism 401.

The following describes the retraction process of the first lock tongue 4011 from the first lock hole 4012 when the unlock button 1071 in Embodiment 1 is pressed:

As shown in FIGS. 1-3 and FIG. 13, a first mounting block 52 is arranged on the lower end portion of the upper push rod 1031, and the first mounting block 52 is provided with a first movable piece 53 that can move up and down, an elastic member (not shown), and a connecting rope (not shown) connected between the upper portion of the first movable piece 53 and the unlock button 1071. The elastic member has a tendency to drive the first movable piece 53 to move downward, a first slope 531 is arranged on the first movable piece 53, and a first contact surface 532 is arranged on the first lock tongue 4011, and when the unlock button 1071 is pressed, the connecting rope pulls the first movable piece 53 upwards, and the first slope 531 moves upward and contacts the first contact surface 532, and drives the first lock tongue 4011 to retract from the first lock hole 4012 through the first contact surface 532.

The following describes the process of driving the second lock tongue 4021 to retract from the second lock hole 4022 when the upper push rod 1031 slides downward relative to the lower push rod 1032 to the end point in Embodiment 1:

As shown in FIGS. 1-3, FIG. 13 and FIG. 14, a second mounting block 54 is arranged on the lower end portion of the lower push rod 1032, and the second mounting block 54 is provided with a second movable piece 55 that can move up and down, and an elastic member (not shown). The elastic member has a tendency to drive the second movable piece 55 to move upward, the upper end portion of the second movable piece 55 protrudes from the upper end surface of the second mounting block 54, a second slope 551 is arranged on the second movable piece 55, and a second contact surface 552 is arranged on the second lock tongue 4021, and when the upper push rod 1031 slides downward relative to the lower push rod 1032 to the end point, the first mounting block 52 arranged on the lower end portion of the upper push rod 1031 contacts the upper end portion of the second movable piece 55, the first mounting block 52 drives the second movable piece 55 to move downward under the action of the impact force fa, so that the second slope 551 moves downward and contacts the second contact surface 552, and drives the second lock tongue 4021 to retract from the second lock hole 4022 through the second contact surface 552.

Compared with Embodiment 2, in Embodiment 1, the impact force fa acts on the lower push rod 1032, which can increase the initial speed of the lower push rod 1032 sliding downward relative to the sliding sleeve 1011, and reduce the time taken for the stroller to complete its automatic folding.

In Embodiment 1, the force on the lower push rod 1032 at the moment when the second locking mechanism 402 is unlocked is analyzed, so as to further illustrate the advantages of the present disclosure.

Figure 12:
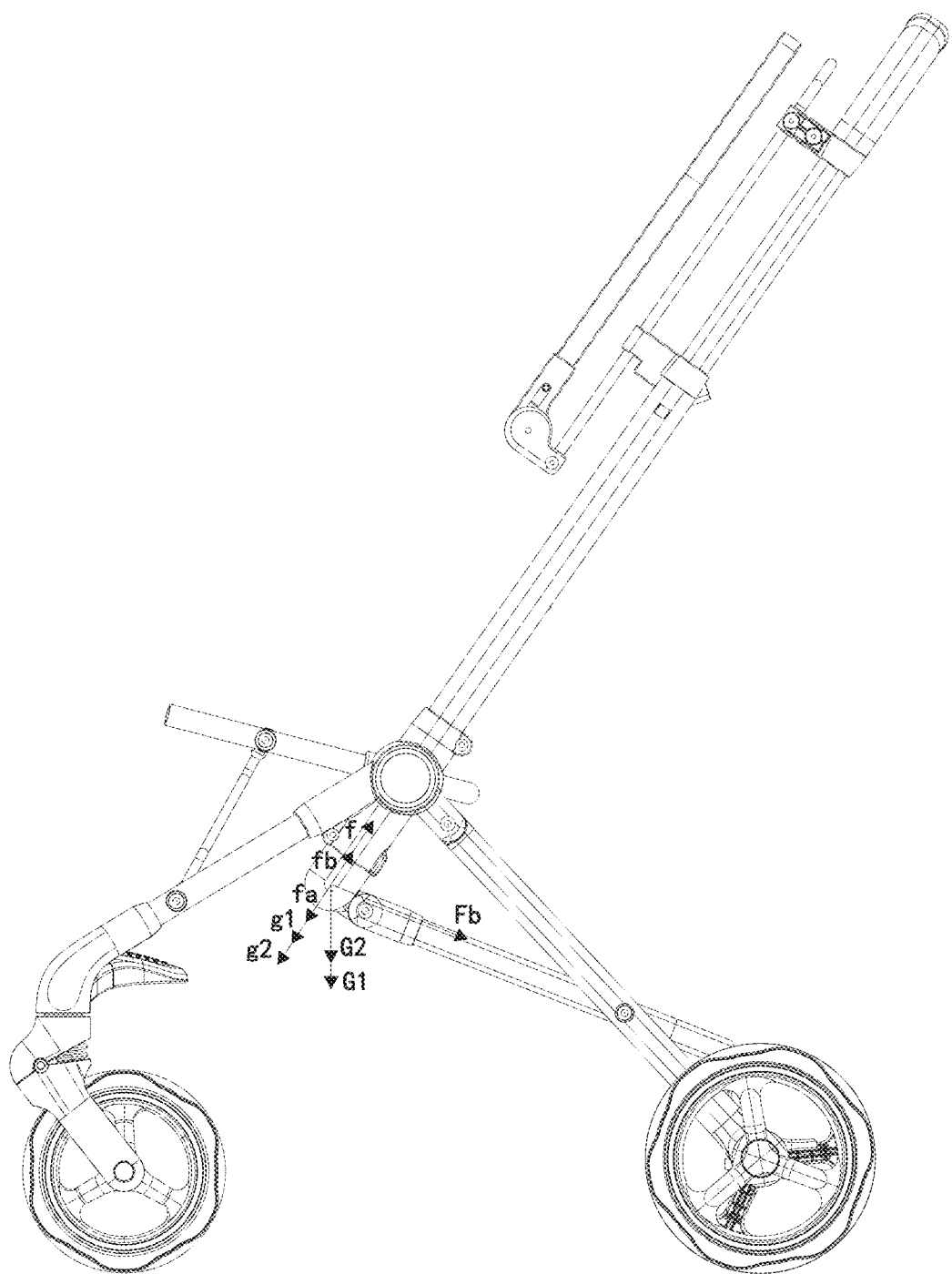
FIG. 12 is a force analysis diagram of the lower push rod in FIG. 4.
Figure 13:
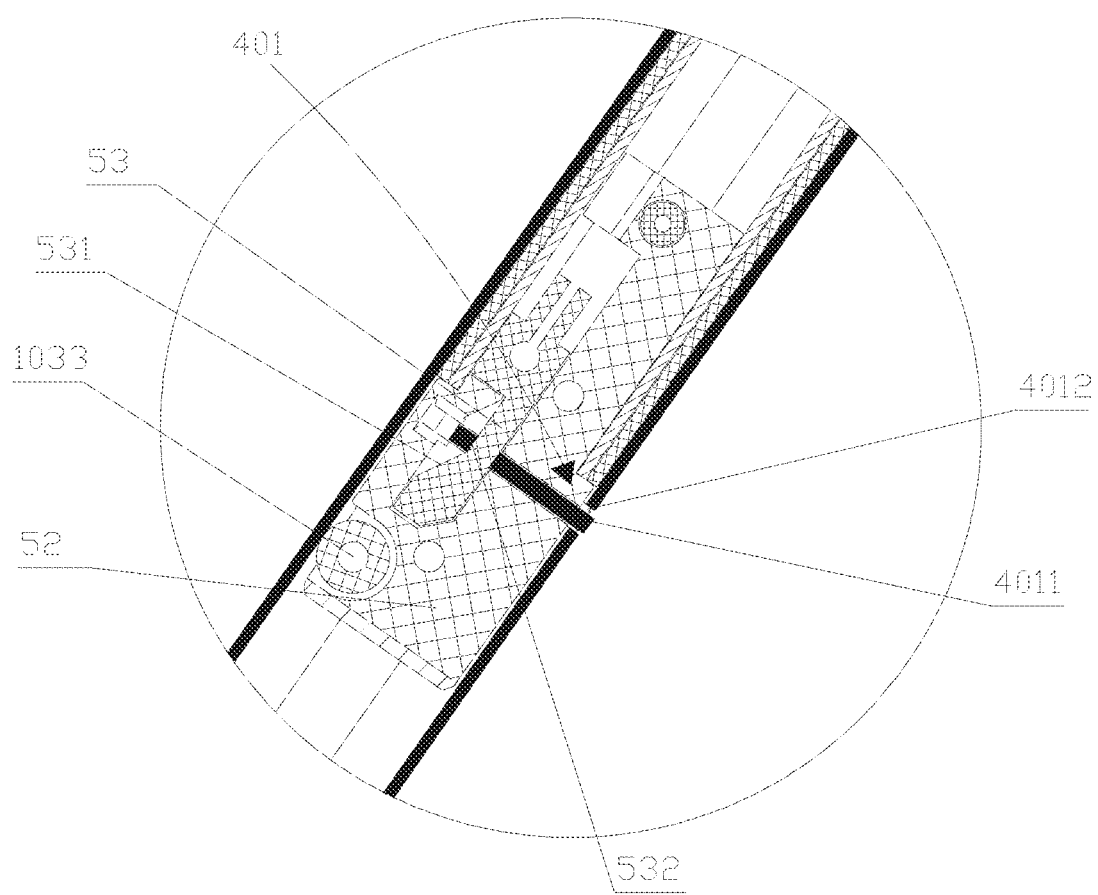
FIG. 13 is a partial enlarged view of Part A in FIG. 2.
Figure 14:
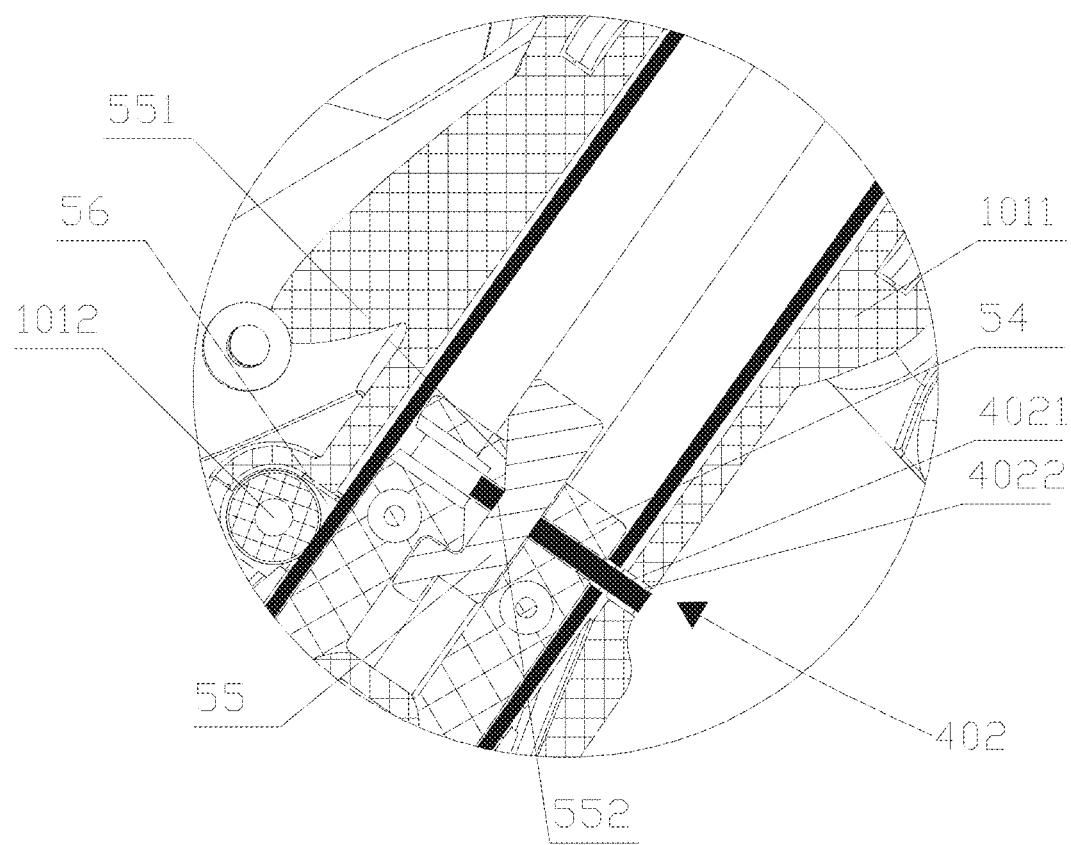
FIG. 14 is a partial enlarged view of Part B in FIG. 2.

When the second locking mechanism 402 is unlocked, the force on the lower push rod 1032 is shown in FIG. 12, the lower push rod 1032 is subjected to in its length direction: the component force g1 of the gravity G1 received by the push rod assembly 103 in the length direction of the lower push rod 1032, the component force g2 of the gravity G2 acting on the push rod assembly 103 by other components (such as the seat rod 105, the push handle 107, the canopy rod 108) connected with the push rod assembly 103 in the length direction of the lower push rod 1032, the impact force fa generated by colliding with the lower push rod 1032 when the upper push rod 1031 slides downward to the end point, and the component force fb of the force Fb acting on the lower push rod 1032 by the basket rod 104 in the length direction of the lower push rod 1032, and the frictional force f between the lower push rod 1032 and the sliding sleeve 1011. When the frame 10 is converted from the unfolded state to the folded state, the directions of the component force g1, the component force g2 and the impact force fa are the same as the sliding direction of the lower push rod 1032 relative to the sliding sleeve 1011, and the component force fb and the friction force f are opposite to the sliding direction of the lower push rod 1032 relative to the sliding sleeve 1011, and $(g1+g2+fa)/(fb+f)>1.05$. In order to prevent the downward sliding speed of the lower push rod 1032 from being too fast after the second locking mechanism 402 is unlocked, $(g1+g2+fa)/(fb+f)<1.5$. In order to maintain a relatively balanced speed when the lower push rod 1032 slides downward, so that the stroller can be folded smoothly, $1.1<(g1+g2+fa)/(fb+f)<1.2$.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

The invention claimed is:

1. A stroller comprising a frame having an unfolded state and a folded state, a front wheel assembly, a rear wheel assembly, a locking mechanism for locking the frame in the unfolded state, and the frame comprises:

a front wheel support, the front wheel assembly is arranged at a lower portion of the front wheel support, and a sliding sleeve is fixedly arranged on an upper portion of the front wheel support;

a rear wheel support, the rear wheel assembly is arranged at a lower portion of the rear wheel support, and an upper portion of the rear wheel support is rotatably connected to the upper portion of the front wheel support;

a telescopic push rod assembly, the push rod assembly comprises an upper push rod and a lower push rod, the upper push rod and the lower push rod are slidably arranged relative to each other, the lower push rod is slidably arranged in the sliding sleeve in a penetrating manner in the length direction thereof, and a lower end portion of the lower push rod is located below the sliding sleeve;

a basket rod, the front end of the basket rod is rotatably connected to the lower end portion of the lower push rod, and the rear portion of the basket rod is rotatably connected to the rear wheel support;

a seat rod extending in a front-rear direction, a rear portion of the seat rod extends downwards and is rotatably connected to the lower end portion of the lower push rod; and a supporting rod, an upper end portion of the supporting rod is rotatably connected to a front portion of the seat rod, and a lower end portion of the supporting rod is rotatably connected to the front wheel support; when the frame is converted from the unfolded state to the folded state, the lower push rod slides downwards relative to the sliding sleeve;

wherein the locking mechanism comprises:

a first locking mechanism for locking the relative positions of the upper push rod and the lower push rod, and when the first locking mechanism is unlocked, the upper push rod slides downwards relative to the lower push rod, and when the upper push rod slides downwards to the end point, it collides with the lower push rod and generates an impact force, and the impact force acts on the lower push rod;

a second locking mechanism for locking the relative positions of the lower push rod and the sliding sleeve, and when the locking mechanism is unlocked, the first locking mechanism is unlocked first, and the impact force drives the second locking mechanism to get unlocked;

the second locking mechanism comprises a retractable lock tongue arranged on the lower push rod and a lock hole arranged on the sliding sleeve, the lock tongue is inserted into the lock hole when the second locking mechanism is in a locked state, and the impact force is used to drive the lock tongue to retract from the lock hole to unlock the second locking mechanism.

2. The stroller according to claim 1, wherein when the first locking mechanism is unlocked, the upper push rod slides downwards after overcoming the frictional force between it and the lower push rod under the action of its own gravity.

3. The stroller according to claim 1, wherein the lower push rod is subjected to the following forces in its length direction: the component force g1 of the gravity G1 subjected by the push rod assembly in the length direction of the lower push rod, the component force g2 of the gravity G2 acting on the push rod assembly by other components connected with the push rod assembly in the length direction of the lower push rod, the impact force fa, and the component force fb of the force Fb acting on the lower push rod by the basket rod in the length direction of the lower push rod, and the frictional force f between the lower push rod and the sliding sleeve, and when the frame is converted from the unfolded state to the folded state, the directions of the component force g1, the component force g2 and the impact force fa are the same as the sliding direction of the lower push rod relative to the sliding sleeve, and the component force fb and the friction force f are opposite to the sliding direction of the lower push rod relative to the sliding sleeve, and $(g1+g2+fa)/(fb+f)>1$.

4. The stroller according to claim 3, wherein $1.05<(g1+g2+fa)/(fb+f)<1.5$.

5. The stroller according to claim 3, wherein $1.1<(g1+g2+fa)/(fb+f)<1.2$.

6. The stroller according to claim 1, wherein the second locking mechanism further comprises a movable piece movably arranged on the lower push rod in an up-down direction, an upper end portion of the movable piece protrudes upwards out of an upper end surface of the lower push rod, and the movable piece is provided with an slope inclined to the upper end surface of the lower push rod, the lock tongue is provided with a contact surface perpendicular to the upper end surface of the lower push rod, and when the movable piece moves downward, the slope moves downwards and drives the lock tongue out of the lock hole through the contact surface.

7. The stroller according to claim 1, wherein when the frame is in the unfolded state, an angle between the basket rod and the lower push rod is an acute angle.

8. The stroller according to claim 1, wherein the upper push rod is slidably arranged in a cavity of the lower push rod in a penetrating manner, a rotatable first roller is arranged on the lower end portion of the upper push rod, and an outer circumferential surface of the first roller is contact with an inner wall of the lower push rod.

9. The stroller according to claim 1, wherein a rotatable second roller is arranged within the sliding sleeve, and an outer circumferential surface of the second roller is contact with an outer wall of the lower push rod.

10. The stroller according to claim 1, wherein the frame further comprises a push handle connected to the upper end portion of the upper push rod, the push handle is provided with an unlock button for unlocking the locking mechanism, and after the unlock button is unlocked, the upper push rod slides downwards after overcoming the frictional force between it and the lower push rod under the action of its own gravity and the gravity of the push handle.

* * * * *